July 22, 1969   W. PINSLY   3,456,578
AUTOMATIC APPARATUS FOR COOKING FOOD
Filed Dec. 14, 1967   2 Sheets-Sheet 1
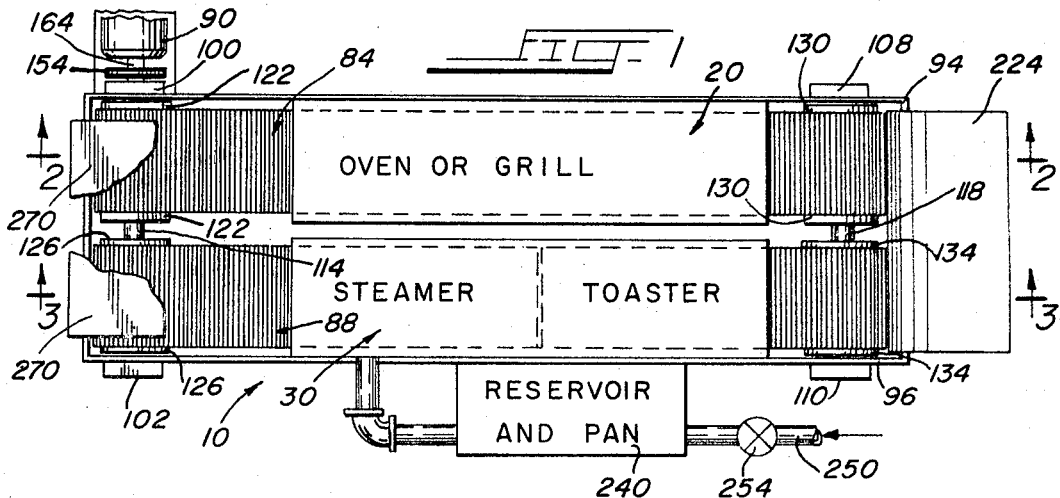
FIG-1
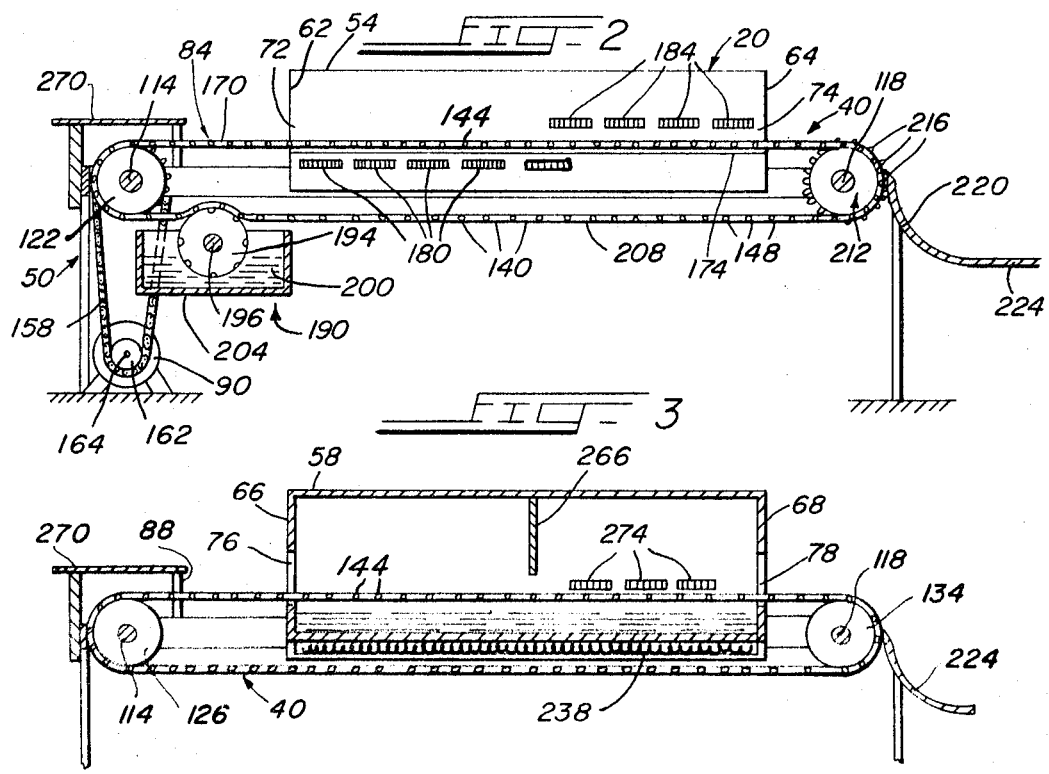
FIG-2
FIG-3
INVENTOR.
WILLIAM PINSLY
BY Kegan, Kegan & Berkman
ATTYS July 22, 1969   W. PINSLY   3,456,578
AUTOMATIC APPARATUS FOR COOKING FOOD
Filed Dec. 14, 1967   2 Sheets-Sheet 2
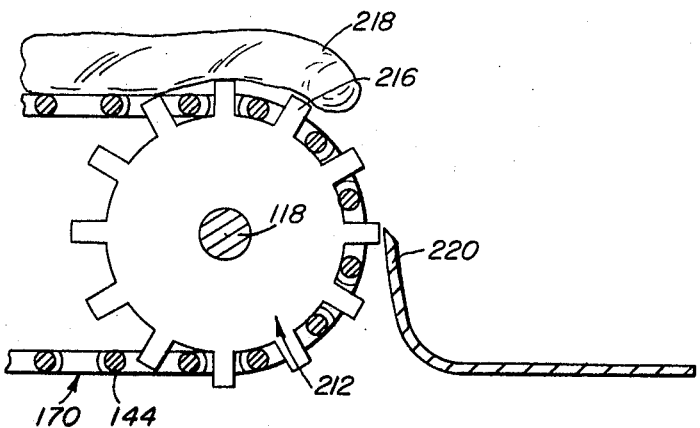
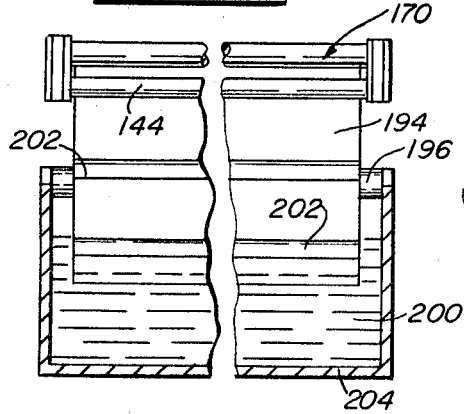
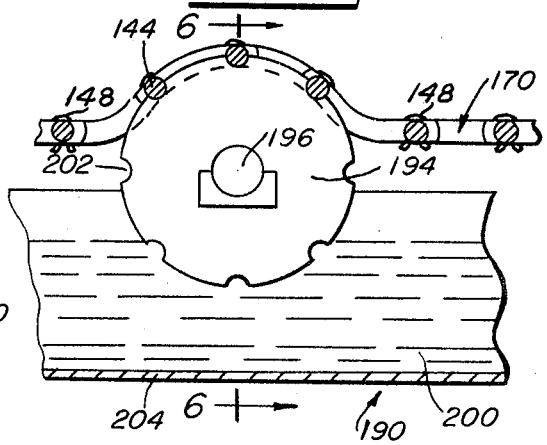
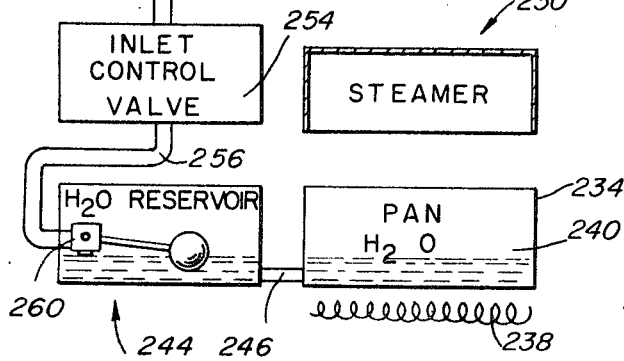
INVENTOR.
WILLIAM PINSLY
BY Kegan, Kegan & Berkman United States Patent Office 3,456,578
Patented July 22, 1969

3,456,578
AUTOMATIC APPARATUS FOR COOKING FOOD
William Pinsly, P.O. Box 671, Hillside, Ill. 60162
Filed Dec. 14, 1967, Ser. No. 690,500
Int. Cl. A47j 27/62, 37/08
U.S. Cl. 99—339                      8 Claims

ABSTRACT OF THE DISCLOSURE

Automatic apparatus for cooking sandwich fillers and for steaming and toasting buns, and including an applicator for applying edible oil to food-carrying surfaces of an endless conveyor to eliminate sticking of food to the conveyor, the apparatus also including stabilized control means for maintaining a preselected water level in the steam generating water pan of the bun steamer.

---

This invention relates to automatic apparatus for cooking food. More particularly, the invention is directed to an improved broiler which automatically conveys and cooks hamburgers and similar food, and which, at the same time, humidifies or moisturizes and toasts the hamburger bun.

Many and varied types of automatic apparatus for cooking food, and specifically hamburgers, steak sandwiches, and the like, are known in the prior art, and appartus proposed has taken many and varied forms. However, each of the prior art devices has one or more series shortcomings which have seriously impaired their usefulness and have dictated against their general acceptance. For example, many of the machines lack the desirable versatility which has become essential to meet the needs of today's consumers' demands. Other machines are complicated in form and require unreasonable attention and frequent servicing. Others are automatic in only minor respects and require the full time presence and attention of operating personnel. Still other equipment, while providing for the cooking of the sandwich filler, includes no facilities for humidifying or moisturizing, or toasting the accompanying bun or bread slices. Others of the prior art automatic devices are unsatisfactory in that they include no simple means by which the cooked sandwich filler may be effectively removed from the supporting conveyor. A related problem of prior art devices is that there is objectionable adherence, sticking, or bonding of the sandwich filler to the conveyor surface. Notwithstanding the extensive research and developmental work that has been carried out in this field, and in spite of the considerable funds which have been allocated to the development of suitable food processing equipment, no completely satisfactory mechanism or apparatus has heretofore been produced. It is, therefore, the aim of the present invention to provide a simple, yet highly effective automatic food processing machine which successfully meets the demanding standards of today's market and which obviates the objectionable features and shortcomings of prior art devices.

It is a principal object of the invention to provide an automatic machine which is selectively operable either intermittently or continuously to meet both low output demands and high production requirements, as the case may be.

Another important object of the invention is to provide automatic apparatus for cooking foods, which apparatus will cook or process not only the sandwich filler but the associated bun or bread slices as well.

It is a related object of the invention to provide a new and improved, continuously-operating, high-production, automatic food cooker in which the elements for making a sandwich can be inserted at one end and the completely cooked sandwich filler and other sandwich components can be removed from the other end, without any attention whatsoever.

A still further object of the invention is to provide an apparatus comprising a grill in combination with a humidifier and toaster, which apparatus is neat and attractive in appearance and sturdy, simple, and inexpensive of construction, but which is readily cleaned and is operated and maintained with minimum of attention.

A more specific object of the invention is to provide, in a food processing apparatus, novel means by which the sticking or adherence of food to the supporting food conveyor is obviated.

Yet another important object of the invention is to provide means by which the cooked sandwich filler is simple yet automatically freed from and removed from the supporting surface of the conveyor.

A related object of the invention is to provide simple, automatic, mechanical means by which the cooked sandwich filler is positively and simply freed from the surface of the transporting conveyor.

Another important object of the invention is to provide, in an automatic food processing machine, an improved steamer or steaming apparatus for moisturing or humidifying hamburger buns and the like.

A related object of the invention is to provide a reliable means by which a regulated and continuous supply of water is provided for the steam generating apparatus.

Other and further objects, aims, advantages and features of the invention will become apparent from a consideration of the following specification taken in conjunction with the drawing in which:

FIGURE 1 is a top plan view of an automatic apparatus for cooking food, and embodying the present invention;

FIGURE 2 is a vertical cross-sectional view taken substantially on the line 2—2 of FIGURE 1 and showing features of the oven or grill compartment of the cooking apparatus;

FIGURE 3 is a vertical cross-sectional view taken substantially on the line 3—3 of FIGURE 1 and showing features of the steamer apparatus of the invention;

FIGURE 4 is an enlarged detail, in elevation, and illustrating the ratchet wheel means by which the grilled sandwich filler is forcibly, mechanically freed from its supporting conveyor;

FIGURE 5 is a fragmentary elevational view of the oiler wheel which applies food oil to the food-contacting surface of the conveyor;

FIGURE 6 is a vertical cross-sectional view taken substantially on the line 6—6 of FIGURE 5; and FIGURE 7 is a diagrammatic representation and illustration of the novel water level control mechanism for the steamer of the invention.

Referring now to the drawings, and particularly to FIGURES 1, 2 and 3, for the purpose of illustrative disclosure the preferred embodiment of the invention is depicted as an automatic cooking apparatus 10 which includes an oven or grill 20, a steamer or steam-toaster 30, and a motor driven conveyor 40, all supported on a suitable metal frame 50 to provide a unitary, compact assembly. The housings 54 and 58 which enclose the oven and the steamer define box-like compartments and are preferably constructed of conventional stainless steel sheeting used in the fabrication of food processing apparatus. The opposed end walls 62 and 64 of the oven housing or compartment 54 and the end walls 66 and 68 of the steamer compartment 58 are provided with ports or openings 72 and 74 and 76 and 78 through which the food-carrying conveyor 40 travels.

The food transporting apparatus or conveyor 40 of the assembly comprises a link belt or articulated endless band which is fabricated of stainless steel elements. In the preferred embodiment of the invention illustrated, the conveyor consists of two distinct such belts 84 and 88, and although the belts may be driven independently, it is convenient, as illustrated in FIGURE 1, to utilize a single motor 90 as the drive means. A pair of longitudinally extending structural supports 94 and 96 arranged one on each side of the main frame 50 carries a pair of rigidly mounted bearing blocks 100 and 102 at one end of the apparatus and a pair of adjustable mounted bearing blocks 108 and 110 at the other end. Parallel shafts 114 and 118 are journaled in each cooperating pair 100 and 102 and 108 and 110 of the bearing blocks, and sprocket wheels 122 and 126 are keyed to the shaft 114 while a sprocket assembly or sprocket wheels 130 and 134 are secured to the other shaft 118.

The conveyor belts 84 and 88 may be fabricated of interconnected wires or rods, or in any preferred manner, and in the specific embodiment of the invention illustrated each of these belts or conveyors is composed of side links 140 which are pivotally connected together by cross rods or transverse bars 144, the outer ends of which are fitted with cotter pins 148 or other suitable fastening means. While the drive shaft 114 may be coupled directly to the motor 90, in the specific example of the invention illustrated, the shaft 114 carries at its outer end a drive sprocket or spur gear 154 coupled through a drive chain 158 to a spur gear 162 carried on the output shaft 164 of the motor 90.

In its passage through the oven or grill 20, the upper reach or upper flight 170 of the conveyor 84 is supported by longitudinally extending channels, tracks, or support bars 174, and the belt or conveyor 84 passes between two partially overlapping sets of heating elements 180 and 184 disposed to extend longitudinally of the apparatus, the first set being positioned below the upper course 170 of conveyor 84, and the second set above. The arrangement described is indicated schematically in FIGURE 2 in which the belt or conveyor 84 travels in a clockwise direction. In the system described, the sandwich filler is cooked or broiled on both sides in a single pass.

Another very important feature of the present invention is an oiler assembly 190 (FIGURES 5 and 6) by means of which edible oil such as a vegetable oil is applied to food-engaging surfaces of the conveyor belt 84 to obviate adherence of food thereto. As shown in FIGURES 2 and 5, the oiling assembly 190 comprises an idler wheel 194 carried on a horizontally extending shaft 196 and rotatably supported to revolve in oil 200 contained in an oil bath or pan 204. The oiler wheel 194, which is formed with the transversely extending grooves or surface declivities 202 is mechanically coupled to and in operative engagement with conveyor cross rods 144 of the lower flight 208 of the conveyor 84 riding thereon, whereby the wheel 194 constitutes automatic applicator means for continuous delivery of oil from the bath to the elements of the conveying belt, as the belt traverses its predetermined endless path.

Referring again to FIGURE 2, the rachet wheel assembly at the far right end of the apparatus comprises a cylindrical drum 212 carrying a plurality of bars, ribs or finger-like teeth 216 which extend outwardly from the generally cylindrical drum surface and project radially through slots or meshes in the conveyor 84. The ribs or teeth 216 constitute mechanical means which forcibly loosen and free cooked sandwich filler elements adhering to the upper surface of the conveyor belt 84. As the sandwich filler 218 passes over the drum 212 and comes into engagement with the ribs or teeth 216, the leading edge of the sandwich filler is lifted from the conveyor belt 84 and engages and rests upon the upper surface of an inclined apron or metal strip 220. The apron 220 delivers the cooked sandwich filler to a receiving shelf 224.

The automatic cooking apparatus of the invention includes novel means for humidifying or moisturizing hamburger buns or the like, and the various components of the steam generating assembly 230 are illustrated schematically in FIGURE 7. As shown, the assembly includes a pan-like vessel 234, a heating unit 238 for transforming the water 240 into steam, and a water supply reservoir 244 coupled to the water pan 234 through a pipe-like conduit 246. A water supply source, such as a city water line 250, is connected to the water reservoir 244 through a conventional shut-off valve 254 and delivery pipe 256. A control valve 260, which may be any preferred type, such as an overflow pipe, but which in the specific embodiment of the invention illustrated comprises a float valve, controls the input of water to the reservoir to maintain the level at a predetermined height. The use of the combination of a water reservoir 244 with a water pan 234 obviates serious problems which have heretofore plagued those who have attempted to ensure that the water pan in which the water is heated to provide steam always contains an assured supply of steam-forming water. The violent agitation and ebullience of the water in the pan constitutes an effective obstacle to the proper functioning of a water level control mechanism in the pan. The present invention eliminates the shortcomings of such prior art arrangements through the expedient of a buffering tank or reservoir 244, the latter being effectively isolated from and free of the disruptive turbulence and agitation existing in the pan 234. From the foregoing description it will be appreciated that the control of the water level in the reservoir 244 serves, in turn, to control the water level, or average water level, in the pan 234, and effective control is achieved irrespective of the agitation and violent ebullience in the steam generating vessel. A fragmentary vertical wall 266 separates the steaming region from the bun-toasting region.

During use of the apparatus, a horizontal shelf 270 which projects laterally from the left end of the machine as viewed in FIGURES 1 and 2 serves as a convenient support for the uncooked food products. This shelf is preferably substantially coplanar with the upper flight 170 of the conveyor so that the operator may easily slide the uncooked sandwich components or other food products directly onto the conveyor. At the opposite end of the assembly the cooked articles of food are automatically removed from the conveyor and discharged onto the shelf 224, as previously described.

Electrical power applied through the motor 90 to the chain 158 rotates the drive shaft 114 and the sprocket wheels 122 and 126 fasten thereon to move the conveyor belts 84 and 88 at a predetermined linear speed. It has been found that for a sandwich filler such as hamburger patties a 1-minute cooking interval is desirable. Accordingly, the machine is adjusted so that the speed of the conveyor will provide a 1-minute cooking interval or stay period within the oven or grill 20. Other cooking intervals are readily established. The sandwich filler and the other sandwich components such as bun halves travel through the respective grill and the steamer-toaster concurrently and in generally parallel array so that while the filler is being grilled, the bun halves are first humidified by the steamer and then toasted as they pass under the heaters or burners 274 downstream of the humidifier section.

What is claimed is:

1. The combination with cooking apparatus including a housing having wall openings at opposed ends and defining a cooking chamber,
   an endless conveyor arranged to transport food through said chamber along a predetermined path,
   a plurality of heating elements functionally disposed within said housing above and below a horizontally extending course of said conveyor along said path for cooking conveyor-carried food transversing said course, a steam generator for generation of steam to moisturize sandwich components such as buns during transporting thereof through said chamber, said steam generator comprising a vessel for containing water to be converted to steam, heating means for converting water in said vessel into steam, of control means for maintaining a substantially constant water level in said steam generator, whereby said water level is maintained constant notwithstanding turbulence and agitation of water in said generator resulting from boiling of said water in generating said steam, said control means comprising:
a water supply reservoir for containing water, water supply means for delivery of water to said reservoir, control means for automatically maintaining water in said reservoir at a predetermined said level, water flow conduit means extending between and interconnecting said vessel and said reservoir for delivery of water from said reservoir to said vessel, control of water in said reservoir at said predetermined level being effective to ensure a continuous, controlled supply of water to said steam generator vessel and to maintain a substantially constant water depth in said vessel irrespective of violent ebullience of said water associated with the heating thereof to generate steam.

2. The apparatus as set forth in claim 1 wherein said housing defines two parallelly disposed longitudinally extending compartments and wherein said conveyor includes first and second horizontally disposed stretches associated respectively with and passing through said compartments cyclically as said conveyor traverses said endless path, one of said stretches adapted for carrying buns through a first of said compartments and the other for carrying uncooked sandwich filler through a second of said compartments, said steam generator being associated with and in communication with said first compartment for moisturizing said buns as they pass therethrough.

3. The apparatus as set forth in claim 2 and further comprising bun toasting heating elements disposed in said first compartment.

4. The apparatus as set forth in claim 1 and further comprising oiler means for applying an edible oil to food-engaging surfaces of said conveyor to obviate adherence of food thereto, said oiler means including, a bath of food oil, an idler wheel rotatably supported to revolve through said bath, said wheel being coupled to and in mechanically driven engagement with said conveyor riding thereon, and constituting automatic transfer means for continuous delivery of oil from said bath to said conveyor and for applying said oil to said conveyor during operative travel thereof on said wheel in traversing said predetermined path.

5. The apparatus as set forth in claim 4 wherein said endless conveyor defines an elongated loop including upper and lower stretches, and wherein a marginal portion of said idler wheel extending upwardly of said oil bath engages said lower of said stretches at an under surface thereof to apply oil thereto.

6. The apparatus as set forth in claim 1 and further comprising a drum-like rotatably mounted sprocket wheel in engagement with said conveyor at a far end of said course, said wheel being provided with radial projections extending outwardly thereof and projecting upwardly through meshes in said conveyor overlying and supported on said wheel, said projections constituting mechanical means for engaging and forcibly freeing cooked sandwich filler adhered to said conveyor.

7. The apparatus as set forth in claim 6 and further comprising a band disposed transversely of said conveyor and proximate to and longitudinally along said sprocket wheel and paralleling a rotational axis thereof, said band comprising means effective to engage a leading edge of cooked sandwich filler as said filler completes a path of travel through said cooking chamber and to lift and to remove said sandwich filler from said conveyor for transfer to a receiving station.

8. The apparatus as set forth in claim 1 wherein said cooking chamber comprises two parallelly disposed substantially linearly coextensive compartments including a bun steamer and toaster compartment, and a sandwich filler cooking compartment, and wherein said conveyor includes first and second conveyor means adjacent to and parallelling one another and travelling in the same direction, each said conveyor means being associated with and passing through a corresponding one of said compartments, and linkage means coupling said conveyor means to each other for coordinated linear movement powered through a single drive means.

References Cited
UNITED STATES PATENTS

| | | | |
|---|---|---|---|
| 1,662,847 | 3/1928 | Cook | 99—443 |
| 1,828,542 | 10/1931 | Padelford | 99—386 XR |
| 1,881,171 | 10/1932 | Cooley. | |
| 2,171,510 | 8/1939 | Stirgwolt | 99—339 XR |
| 2,238,309 | 4/1941 | Cramer | 99—386 |
| 2,565,174 | 8/1951 | Fredenhagen et al. | 99—386 |
| 2,604,199 | 7/1952 | Govan. | |
| 2,917,990 | 12/1959 | Ehrenberg | 99—386 |
| 3,019,744 | 1962 | Carvel | 99—423 XR |
| 3,340,794 | 9/1967 | Giuliano | 99—443 |

BILLY J. WILHITE, Primary Examiner

U.S. Cl. X.R.

99—355, 386, 391, 443; 118—17